United States Patent
MacDonald et al.

(10) Patent No.: US 11,966,788 B2
(45) Date of Patent: Apr. 23, 2024

(54) PREDICTIVE AUTOSCALING AND RESOURCE OPTIMIZATION

(71) Applicant: SNYK LIMITED, Berkshire (GB)

(72) Inventors: Jevon MacDonald, Halifax (CA); James Bowes, Dartmouth (CA); Domenic Rosati, Halifax (CA)

(73) Assignee: SNYK LIMITED, Berkshire (GB)

( * ) Notice: Subject to any disclaimer, the term of this patent is extended or adjusted under 35 U.S.C. 154(b) by 27 days.

(21) Appl. No.: 17/618,621

(22) PCT Filed: Jun. 12, 2020

(86) PCT No.: PCT/US2020/037598
§ 371 (c)(1),
(2) Date: Dec. 13, 2021

(87) PCT Pub. No.: WO2020/252390
PCT Pub. Date: Dec. 17, 2020

(65) Prior Publication Data
US 2022/0244993 A1 Aug. 4, 2022

Related U.S. Application Data

(60) Provisional application No. 62/864,476, filed on Jun. 20, 2019, provisional application No. 62/860,740, filed on Jun. 12, 2019.

(51) Int. Cl.
*G06F 9/50* (2006.01)
*G06F 8/60* (2018.01)
(Continued)

(52) U.S. Cl.
CPC ............. *G06F 9/505* (2013.01); *G06F 8/60* (2013.01); *G06F 9/5083* (2013.01);
(Continued)

(58) Field of Classification Search
CPC ........ G06F 9/505; G06F 8/60; G06F 11/3409; G06F 9/5083; G06F 11/302; G06F 11/3433; G06F 2209/5019
See application file for complete search history.

(56) References Cited

U.S. PATENT DOCUMENTS 8,397,088 B1* 3/2013 Ghose ................. G06F 1/3209
713/300
10,439,870 B2* 10/2019 Chen ..................... G06F 9/5011
(Continued)

FOREIGN PATENT DOCUMENTS

WO 2002/093894 A2 11/2002

OTHER PUBLICATIONS

Iqbal et al., Predictive Auto-Scaling of Multi-Tier Applications Using Performance Varying Cloud Resources, EEE Transactions on Cloud Computing (Sep. 2019). (Year: 2019).*
(Continued)

*Primary Examiner* — Benjamin C Wu
(74) *Attorney, Agent, or Firm* — Hamilton, Brook, Smith & Reynolds, P.C.

(57) ABSTRACT

Techniques for predictive autoscaling and resource optimization of software deployments. In an implementation, users declare performance objectives, and machine learning of application behavior and load profile is to used to determine minimum cost resourcing to meet the declared performance objectives. In an embodiment, convergent deployments are monitored and related feedback is provided to improve forecasting, behavior modeling, and resource estimation over time.

20 Claims, 6 Drawing Sheets

(51) Int. Cl.
  *G06F 11/30* (2006.01)
  *G06F 11/34* (2006.01)
(52) U.S. Cl.
  CPC ........ *G06F 11/302* (2013.01); *G06F 11/3409* (2013.01); *G06F 11/3433* (2013.01); *G06F 2209/5019* (2013.01)

(56) References Cited

U.S. PATENT DOCUMENTS

| | | | | |
|---|---|---|---|---|
| 10,445,134 | B2* | 10/2019 | Borthakur | G06F 9/4856 |
| 11,593,180 | B2* | 2/2023 | Gupta | G06F 9/5044 |
| 2005/0165925 | A1* | 7/2005 | Dan | H04L 67/1025 |
| | | | | 709/224 |
| 2006/0167984 | A1* | 7/2006 | Fellenstein | G06Q 30/08 |
| | | | | 709/203 |
| 2008/0270595 | A1* | 10/2008 | Rolia | G06F 11/263 |
| | | | | 709/224 |
| 2010/0058342 | A1* | 3/2010 | Machida | G06F 9/5077 |
| | | | | 718/1 |
| 2012/0089726 | A1* | 4/2012 | Doddavula | H04L 67/34 |
| | | | | 709/224 |
| 2012/0110462 | A1* | 5/2012 | Eswaran | H04L 12/1439 |
| | | | | 709/224 |
| 2013/0174149 | A1* | 7/2013 | Dasgupta | G06F 9/5077 |
| | | | | 718/1 |
| 2013/0198050 | A1 | 8/2013 | Shroff et al. | |
| 2015/0032495 | A1* | 1/2015 | Senarath | G06Q 10/06313 |
| | | | | 705/7.23 |
| 2015/0263985 | A1* | 9/2015 | Schmitter | H04L 45/123 |
| | | | | 709/226 |
| 2018/0287955 | A1* | 10/2018 | Fitzgerald | H04L 41/0896 |
| 2018/0321971 | A1* | 11/2018 | Bahramshahry | G06F 9/5044 |
| 2019/0164080 | A1 | 5/2019 | Stefani et al. | |
| 2019/0340033 | A1* | 11/2019 | Ganteaume | H04L 43/16 |
| 2019/0342379 | A1* | 11/2019 | Shukla | G06F 16/219 |
| 2020/0073717 | A1* | 3/2020 | Hari | G06F 9/5061 |
| 2020/0089515 | A1* | 3/2020 | Hari | G06N 3/02 |
| 2021/0073114 | A1* | 3/2021 | Haubold | G06F 11/3688 |
| 2021/0182108 | A1* | 6/2021 | Eberlein | G06F 11/301 |
| 2022/0124005 | A1* | 4/2022 | Doshi | H04L 47/821 |
| 2022/0188172 | A1* | 6/2022 | Gupta | G06F 9/5044 |
| 2022/0300344 | A1 | 9/2022 | MacDonald et al. | |
| 2022/0318065 | A1* | 10/2022 | Chen | G06F 9/5072 |

OTHER PUBLICATIONS

International Search Report and Written Opinion dated Aug. 18, 2020, for Application No. PCT/US2020/037598.

Shen, Z., et al., "CloudScale: elastic resource scaling for multi-tenant cloud systems," SOCC '11: Proceedings of the 2nd ACM Symposium on Cloud Computing; Article No. 5, pp. 1-14 (Oct. 2011).

European Search Report for EP 20823465.8, dated Jun. 12, 2023.

* cited by examiner

PREDICTIVE AUTOSCALING AND RESOURCE OPTIMIZATION

CROSS-REFERENCE TO RELATED APPLICATIONS

This application is a 35 U.S.C. 0371 national stage application of PCT/US2020/037598 filed Jun. 12, 2020, and entitled "Predictive Autoscaling and Resource Optimization" which claims benefit of U.S. provisional patent application No. 62/860,740 filed Jun. 12, 2019, and U.S. provisional patent application No. 62/864,476 filed Jun. 20, 2019, all of which are hereby incorporated herein by reference in their entirety for all purposes.

BACKGROUND

Capacity planning and cost optimization for software operations are areas of ongoing research and development. Over-provisioning leads to resource waste and extra cost, yet the industry standard is an average of 80-93% over-provisioned. Under-provisioning causes performance degradation and violation of SLAs. Research shows that performance degradation in web applications can result in up to 75% increase in churn. "Preliminary results . . . of cloud service availability show an average of 7.738 hours unavailable per year or 99.91% availability . . . . The cost of these failures amounts for almost 285 million USDs based on hourly costs accepted in industry." Downtime Statistics of Current Cloud Solutions (Updated version—March 2014) by Cérin et al.

Manually determining capacity is practically always wrong due to the dynamic nature of resource utilization and application load. Reactive autoscaling, by definition, fails to meet load ahead of time. Threshold-based auto scaling requires significant work and fails to align with defined service level objectives even when using custom application level metrics. At best an 80% utilization threshold results in 20% under-capacity. Research shows that threshold-based autoscalers fail to adapt to changing workloads.

Techniques to address these and other deficiencies associated with capacity planning and cost optimization are desirable.

SUMMARY

Disclosed is a cost and performance management solution for software resourcing and scaling. In a specific implementation, the system operates on software deployment orchestration platforms such as Kubernetes that expose application and resource metrics as well as provide standard scaling and resourcing mechanisms. Users declare performance objectives and the system learns application behavior and load profile to determine minimum cost resourcing to meet the declared performance objectives.

DETAILED DESCRIPTION

Figure 1:
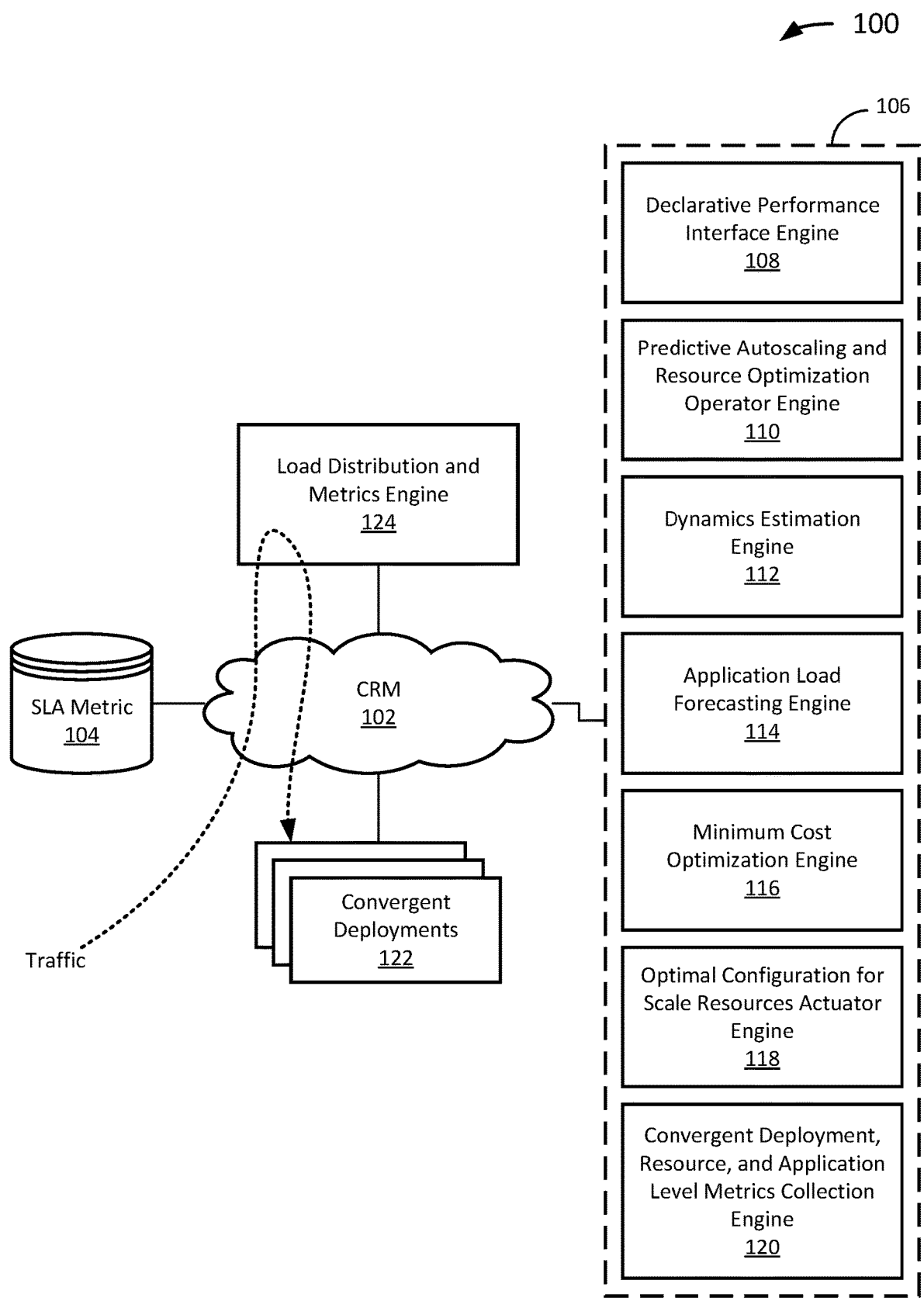
FIG. 1 depicts a diagram of an example of a predictive autoscaling and resource optimization system.

FIG. 1 depicts a diagram 100 of an example of a predictive autoscaling and resource optimization system. As used in this paper, resources can be characterized as central processing unit (CPU), memory, network input/output (I/O), disk I/O, graphics processing unit (GPU), and/or other applicable resources. The diagram 100 includes a computer-readable medium (CRM) 102, a service level agreement (SLA) metric datastore 104 coupled to the CRM 102, a feedforward control system for a software orchestration platform 106 coupled to the CRM 102, convergent deployments 122 coupled to the CRM 102, and a load distribution and metrics engine 124 coupled to the CRM 102. The feedforward control system for a software orchestration platform 106 includes a declarative performance interface engine 108, a predictive autoscaling and resource optimization operator engine 110, a dynamics estimation engine 112, an application load forecasting engine 114, a minimum cost optimization engine 116, an optimal configuration for scale resources actuator engine 118, and a convergent deployment, resource, and application level metrics collection engine 120. A predictive autoscaling and resource optimization system can be fully implemented; implemented as a staged integration (e.g., into a Kubernetes cluster), with customers having control over whether changes are made live and how much change is allowed; or implemented with a sample of platform data to provide a cost savings and/or performance improvement report.

The CRM 102 is intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures in this paper.

Engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

Referring once again to the example of FIG. 1, the SLA metric datastore 104 is intended to represent a datastore that includes data structures representing declared performance objectives for software deployments. The SLA metric datastore 104 can include a service level indicator (SLI) data structure. In information technology, an SLI is a measure of a service level provided by a service provider to a customer. SLIs form the basis of a service level objective (SLO), which in turn form the basis of an SLA. The SLA metric datastore 104 can instead or in addition include an SLO data structure. As such, as used in this paper, one or both of an SLI and an SLO can be treated as an SLA metric. Although it is assumed for illustrative purposes that granular SLIs or SLOs are converted into declarative performance targets, a combination of SLIs and/or SLOs could be formed into an SLA data structure, stored in the SLA metric datastore 104, and converted into an aggregated declarative performance target. In a specific implementation, the declared performance objectives are on behalf of a service consumer responsible, at least in part, for a software deployment. Service consumers can include entities that build, provide, or host software products that require inclusion of one or more services (e.g., compute resources) for desired function and operation. For example, a service consumer can include a company, an organization, an institution, a venture, a group, a person, or some other applicable entity or group of entities.

The feedforward control system for a software orchestration platform 106 is intended to represent a system that includes engines and datastores used for proactive scaling to prepare for predicted load ahead of time, thus mitigating provisioning delay for software deployments. Proactive scaling of applications and application resources enables provisioning of resources to meet future load. In various embodiments, the feedforward control system for a software orchestration platform 106 reduces the cost of running applications by reducing resource consumption; improves performance of applications by constantly resourcing and scaling applications so they can meet performance objectives both for current load and for predicted load; allows users to be confident in the SLOs they have set by having a resourcing and scaling mechanism go out and meet it; and/or reduces the manual time and effort involved analyzing applications for the purposes of resourcing and scaling them correctly. In a specific implementation, the feedforward control system for a software orchestration platform 106 forecasts both random and regular workloads with up to 90% accuracy; preemptive resourcing results in an average of 10 times less SLA violations. Preemptive resourcing for an application means under-provisioning is at least ameliorated and, ideally, eliminated. In a specific implementation, the feedforward control system for a software orchestration platform 106 can learn from decisions made in order to improve forecasting, modeling, resource estimation, and other applicable decisions.

The declarative performance interface engine 108 is intended to represent an engine used in coordination with a control system type technology (described in association with other engines of the feedforward control system for a software orchestration platform 106) to consume target performance metrics associated with a software deployment from the SLA metric datastore 104 and provide a declarative performance target to the control system type technology to devise an actuation program to achieve the target. In a specific implementation, the declarative performance interface engine 108 defines references or targets, the declaration of which can be characterized as a "declarative performance" and the definition of which can be characterized as a "declarative performance objective" or a "declarative performance target." The declarative performance interface engine 108 enables a human or artificial agent of a service provider (or service consumer) to define an SLA metric, such as an SLI or an SLO, for storage in the SLA metric datastore 104 as targets for which the feedforward control system for a software orchestration platform 106 resources applications. By declaring performance, human agents are not required to exert effort manually analyzing their applications, configuring their applications, and resourcing their applications each time a software or application load changes; and artificial agents need not be AIs. Advantageously, the declarative performance interface engine 108 allows a service provider to rely upon a declared SLO (or an SLO derived from one or more declared SLIs) for an SLA offered to a service consumer. In a specific implementation, implementing the declarative performance interface engine 108 and control system type technology as described in this paper resulted in an average 70% increase in SLA compliance.

The predictive autoscaling and resource optimization operator engine 110 is intended to represent an engine that autoscales in response to predicted resource needs without over-provisioning. Resource optimization is intended to mean provisioning the minimum resources needed to meet declared performance objectives. In a specific implementation, the predictive autoscaling and resource optimization operator engine 110 makes changes automatically, recommends more cost effective SLOs, and sends alerts regarding potential performance degradation. In a specific implementation, the predictive autoscaling and resource optimization operator engine 110 is robust against both seasonal and random application load and resource signatures by using a deep learning approach sensitive to trends and seasonality, and is trained to be sensitive to leading indicators of random bursts. In a specific implementation, the predictive autoscaling and resource optimization operator engine 110 is easy to install with support for interchangeable metrics collection and load balancers; is able to operate on a cloud or on-prem; and can make recommendations in as little as 5 minutes (in coordination with engines and datastores of the feedforward control system for a software orchestration platform 106).

In a specific implementation, the predictive autoscaling and resource optimization operator engine 110 does not interfere with a Kubernetes scheduler. Kubernetes is an open-source container-orchestration system for automating application deployment, scaling, and management maintained by the Cloud Native Computing Foundation. It aims to provide a "platform for automating deployment, scaling, and operations of application containers across clusters of hosts". It works with a range of container tools, including Docker. Many cloud services offer a Kubernetes-based platform or infrastructure as a service (PaaS or IaaS) on which Kubernetes can be deployed as a platform-providing service. Many vendors also provide their own branded Kubernetes distributions. The document entitled "The Kubernetes Architectural Roadmap" by Brian Grant, Tim Hockin, and Clayton Colman, last updated Apr. 20, 2017, is incorporated herein by reference.

In a specific implementation, the predictive autoscaling and resource optimization operator engine 110 works well with horizontal and cluster autoscalers. For example, a Kubernetes horizontal pod autoscaler automatically scales the number of pods in a replication controller, deployment or replicaset based on observed CPU utilization. As another example, Oracle Cloud Platform allows server instances to automatically scale a cluster in or out by defining an auto-scaling rule based on CPU and/or memory utilization to determine when to add or remove nodes.

In a specific implementation, the predictive autoscaling and resource optimization operator engine 110 receives as input 1) measured outputs from the convergent deployment, resource, and application level metrics collection engine 120 and 2) predicted outputs from the application load forecasting engine 114. In a specific implementation, the predictive autoscaling and resource optimization operator engine 110 determines measured error from performance objectives, which is provided to the dynamics estimation engine 112.

The dynamics estimation engine 112 is intended to represent an engine that estimates a minimum amount of resources needed to meet service level objectives under predicted and current load. In a specific implementation, the dynamics estimation engine 112 models application behavior in terms of resource utilization and models performance as a response to load. By modeling an application's response and resource utilization under load, it becomes possible to enable estimations for vertical and horizontal autoscaling and, based on the modeling, estimate how many resources will be used under certain load and corresponding service indicators such as time to process request; a deployment request is set accordingly.

The application load forecasting engine 114 provides a load estimate out to a future time. Depending upon implementation-specific factors, the future time is configurable to be as little as a minute or as much as an hour into the future. In a specific implementation, the application load forecasting engine 114 provided 91% accurate load forecasting. Advantageously, by predicting incoming application load in advance, it is possible to scale up before load events happen, even across a wide variety of workloads. For example, using a deep learning approach that has been proven to generalize across a wide variety of workloads, the application load forecasting engine 114 can forecast seasonal, trendy, bursty, and random load with a high degree of accuracy (at least 83% or as high as over 95%). Based on a request and an understanding of workload, signature limits can be set on a deployment according to a utilization pattern (e.g., bursty resulting in a higher limit vs. stable resulting in a lower limit).

The minimum cost optimization engine 116 uses current load, the forecasted load from the application load forecasting engine 114, the application behavior model from the dynamics estimation engine 112, and declared objectives from the declarative performance interface engine 108 to find a minimum cost to run the modeled application at a performance appropriate for the declared objectives, which is a tradeoff between replicas of an application (horizontal scale) and resources (vertical scale). A focus on optimization for performance objectives results in cost optimization. Advantageously, in a specific implementation, this results in an average of up to 80% cost savings compared to systems without such focus.

The optimal configuration for scale resources actuator engine 118 is intended to represent an actuator that is unique to a problem space. In a specific implementation, a forecasting model is robust against different time series profiles because parametric time series models are, by their nature, tuned to one type of time series profile. These profiles include on-off workloads, bursty workloads, workloads with various trends, and workloads with different seasonality components (seconds, minutes, hours, etc.). This can be accomplished by training a model off line for forecasting against many different time series profiles; a recurrent neural network can be utilized for this purpose. The off line model is then deployed in the system and the optimal configuration for scale resources actuator engine 118 can be characterized as unique to a problem space associated with one type of time series profile.

The optimal configuration for scale resources actuator engine 118 executes the optimal configuration for scale resources, such as number of replicas, size of resource requests, and quality of service (as defined by limits with which to kill or throttle application resource usage). By understanding an application under load, the number of replicas and virtual machine (VM) instance types (in the case of network and disk bound applications) selected for meeting forecasted demand according to performance objectives at minimum cost can be optimized, thus minimizing resources needed to meet forecasted demand.

In a specific implementation, the optimal configuration for scale resources actuator engine 118 uses heuristics unique to the scale resource such as maximum allocatable resources and oscillation damping through consensus-based recommendations. The optimal configuration for scale resources actuator engine 118 causes an application to be executed as one of the convergent deployments 122.

The convergent deployment, resource, and application level metrics collection engine 120 is intended to represent an engine that measures feedback and feedforward (forecasting) based on current performance and predicted load. The feedback can come in the form of system output from the optimal configuration for scale resources actuator engine 118 or the convergent deployments 122, or in the form of other data associated with the relevant convergent deployment of the convergent deployments 122 provided through or observed on the CRM 102. The feedback and feedforward is used by the predictive autoscaling and resource optimization operator engine 110 to adjust recommendations. In a specific implementation, the convergent deployment, resource, and application level metrics collection engine 120 monitors performance indicators and resource usage, including SLIs such as request count and request duration, and resource utilization metrics such as memory, CPU, disk I/O, and network I/O per container and pod.

The convergent deployments 122 are intended to represent engines executing applications with a convergent configuration. A convergent configuration is one that is executed by the optimal configuration for scale resources actuator engine 118 to incorporate predictive autoscaling and resource optimization.

The load distribution and metrics engine 124 is intended to represent an engine that designates how application load metrics are collected and configured to be distributed. In a specific implementation, the load distribution and metrics engine 124 performs load balancing on traffic to (or from) the convergent deployments 122. Load balancing improves the distribution of workloads across multiple computing resources, such as computers, a computer cluster, network links, CPUs, or disk drives. Load balancing aims to optimize resource use, maximize throughput, minimize response time, and avoid overload of any single resource. Using multiple components with load balancing instead of a single component may increase reliability and availability through redundancy. Load balancing usually involves dedicated software or hardware, such as a multilayer switch or a Domain Name System server process. Load balancing differs from channel bonding in that load balancing divides traffic between network interfaces on a network socket (OSI model layer 4) basis, while channel bonding implies a division of traffic between physical interfaces at a lower level, either per packet (OSI model Layer 3) or on a data link (OSI model Layer 2) basis with a protocol such as shortest path bridging. However, channel bonding is treated as load balancing in this paper. In an alternative, a proxy takes on the load distribution and metrics functionality in lieu of what would likely be referred to as a "load balancer."

Where it matters for the purpose of distinction in this paper, "load distribution and metrics engine" is a more general term for application load metrics collection and configuration for distribution than load balancer, proxy, or other applicable specific application load distribution and metrics system. Indeed, in a specific implementation, an application load metrics collection and distribution engine is used without a load balancer. For example, the load distribution and metrics engine 124 can collect metrics from and configure an application proxy such as Envoy, an L7 proxy and communication bus designed for large modern service oriented architectures. As another example, the load distribution and metrics engine 124 can make use of other load systems, such as message queues. In general, the load distribution and metrics engine 124 can be used across different workloads (instead of or in addition to network-based workloads to which a load balance caters).

The load distribution and metrics engine 124 is informed by the optimal configuration for scale resources actuator engine 118 to balance traffic in a manner appropriate for the convergent deployments 122. The convergent deployment, resource, and application level metrics collection engine 120 can also collect data from the load distribution and metrics engine 124.

In an example of operation, a human or artificial agent of a service provider (or service consumer) uses the declarative performance interface engine 108 to store an SLA metric, such as an SLI or an SLO, in the SLA metric datastore 104. In an alternative, the agent can store an SLA metric in the SLA metric datastore 104 through an SLA metric datastore interface (not shown). Depending upon what is stored, the SLA metric datastore 104 could be referred to as an SLI datastore, an SLO datastore, or an SLA datastore.

Continuing this example of operation, the declarative performance interface engine 108 converts the data structures into declarative performance objectives for consumption by the predictive autoscaling and resource optimization operator engine 110. When applicable data becomes available from the convergent deployment, resource, and application level metrics collection engine 120, the dynamics estimation engine 112 models application behavior in terms of resource utilization and models performance as a response to load, and the application load forecasting engine 114 provides a load estimate out to a future time.

Continuing this example of operation, the minimum cost optimization engine 116 uses the forecasted load from the application load forecasting engine 114, the application behavior model from the dynamics estimation engine 112, and declared objectives from the declarative performance interface engine 108, to find a minimum cost to run the modeled application at a performance appropriate for the declared objectives. The predictive autoscaling and resource optimization operator engine 110 provides the minimum cost optimization parameters to the optimal configuration for scale resources actuator engine 118, which executes the convergent deployments 122 and configures the load distribution and metrics engine 124 in accordance with the minimum cost optimization parameters. In a specific implementation, configuring the load distribution and metrics engine 124 involves making provisioned resources known to the load distribution and metrics engine 124, which may occur as a matter of course.

Continuing this example of operation, the convergent deployment, resource, and application level metrics collection engine 120 monitors channels and other resources associated with the convergent deployments 122, which can be processed (to generate, e.g., measured outputs) and provided as feedback to the predictive autoscaling and resource optimization operator engine 110, the dynamics estimation engine 112, and the application load forecasting engine 114. The feedback can be used to provide an initial data set or to improve upon modeling and recommendations over time.

Figure 2:
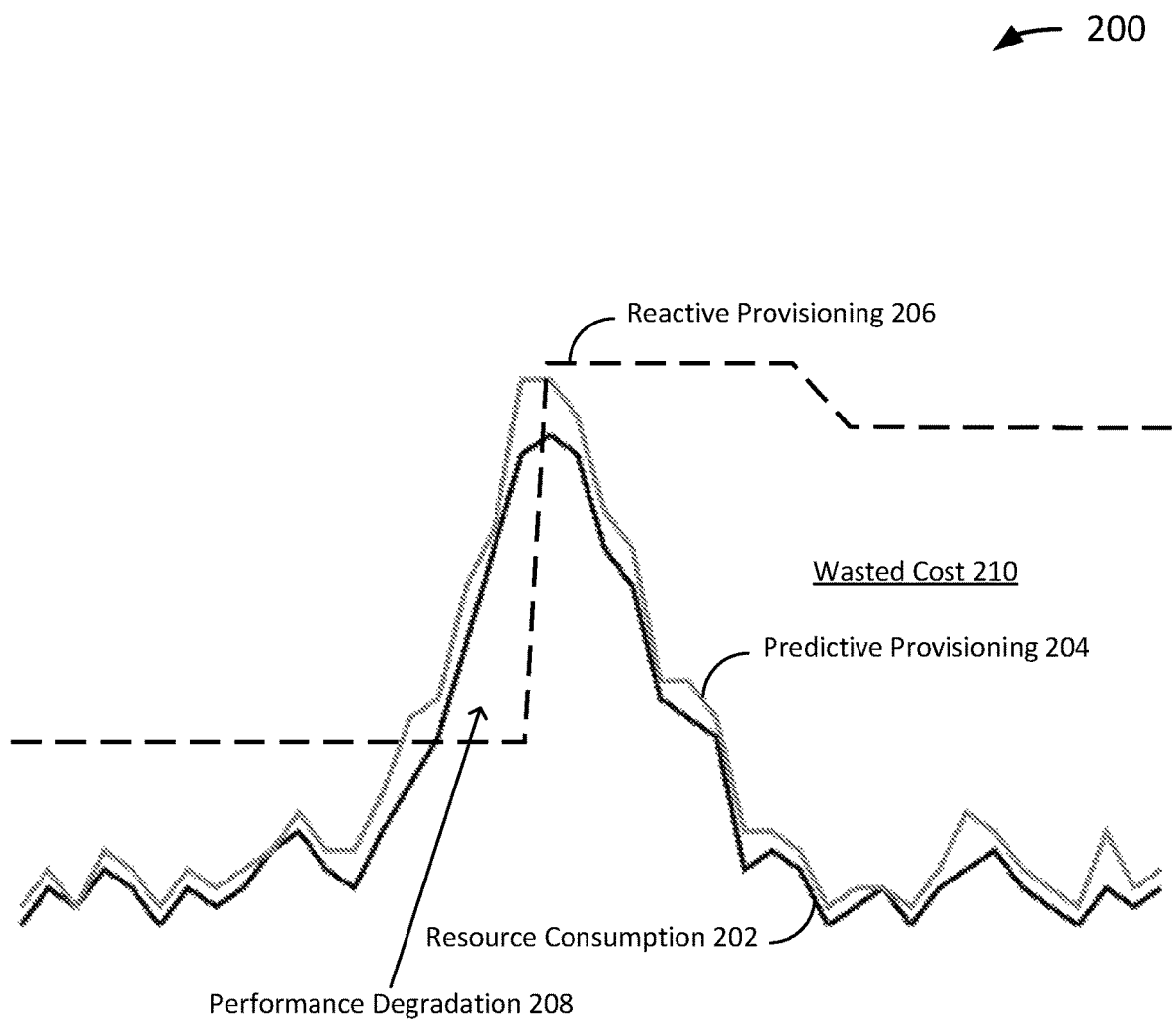
FIG. 2 depicts a graph that compares resource provisioning pursuant to the recommendations of a reactive recommendation engine with resource provisioning pursuant to the recommendations of a predicted recommendation engine.

FIG. 2 depicts a graph 200 that compares resource provisioning pursuant to the recommendations of a reactive recommendation engine with resource provisioning pursuant to the recommendations of a predicted recommendation engine. The graph 200 includes a resource consumption curve 202, a predictive provisioning curve 204, a reactive provisioning curve 206, a performance degradation area 208, and a wasted cost area 210. The resource consumption curve 202 is intended to represent amount of resources used (y axis) over time (x axis). The predictive provisioning curve 204 is intended to represent resources provisioned pursuant to recommendations of a predictive recommendation engine. The reactive provisioning curve 206 is intended to represent resources allocated pursuant to recommendations of a reactive recommendation engine, as an alternative to a predictive recommendation engine.

As the graph 200 illustrates, the performance degradation area 208 is greater for the reactive provisioning curve 206 than it is for the predictive provisioning curve 204. Indeed, the predictive provisioning curve 204 matches or slightly exceeds the resource consumption curve 202 over the measured time period, which means there is no performance degradation for the system utilizing the predictive recommendation engine. It may be noted, performance degradation occurs when a provisioning curve is less than the resource consumption curve 202, which means under-provisioning has occurred.

As the graph 200 illustrates, the wasted cost 210 is greater for the reactive provisioning curve 206 than it is for the predictive provisioning curve 204. While the predictive provisioning curve 204 exceeds the resource consumption curve 202 at most points of the graph 200, the amount of wasted cost is substantially less than that associated with the reactive provisioning curve 206. A reactive provisioning system cannot achieve correct provisioning before 5 minutes of reacting to load because, while there are scale up events before 5 minutes (e.g., with a 1-2 minute reaction time), following the curve downwards is difficult and a reactive algorithm degrades over time. In a specific implementation, correct provisioning (with provisioning insurance) takes less than 5 minutes after load. Because a reactive provisioning system cannot achieve correct provisioning before it receives metrics, calculates requests, and actuates those, it is impossible for a reactive system to act within a minute of load, which is well within the capabilities of the specific implementation. Advantageously, in this specific implementation, which has a correctly configured predictive system, correct provisioning can be achieved within x minutes ahead of load or the resource being required or consumed, with x being a configurable look ahead time greater than 1 minute and less than 1 hour.

Wasted cost occurs when a provisioning curve is more than the resource consumption curve 202 plus provisioning insurance. In simplistic terms, wasted cost of less than x % of resource consumption over a minute can be referred to as provisioning insurance, which is desirable in many instances to ensure under-provisioning does not occur. Provisioning insurance can be defined as the x % likelihood a resource value will be under a provisioned amount, either as a 95% likelihood as 2 standard deviations from the mean value and/or a peak-to-mean ratio (crest factor). In a specific implementation, both of these heuristics are used. The 95% likelihood a resource value will be under a provisioned amount is used for requests (e.g., how many resources to request) while the crest factor is used for determining limits (e.g., how many resources an application is allowed to consume beyond the request before killing, throttling, or compressing the resource usage). The difference between requests and limits in a software orchestration platform can be referred to as quality of service (QoS), which defines whether you always guarantee resources are available (i.e., requests and limits are the same) or you allow software to burst above its request as necessary when resources are available (i.e., limits are above requests).

Figure 3:
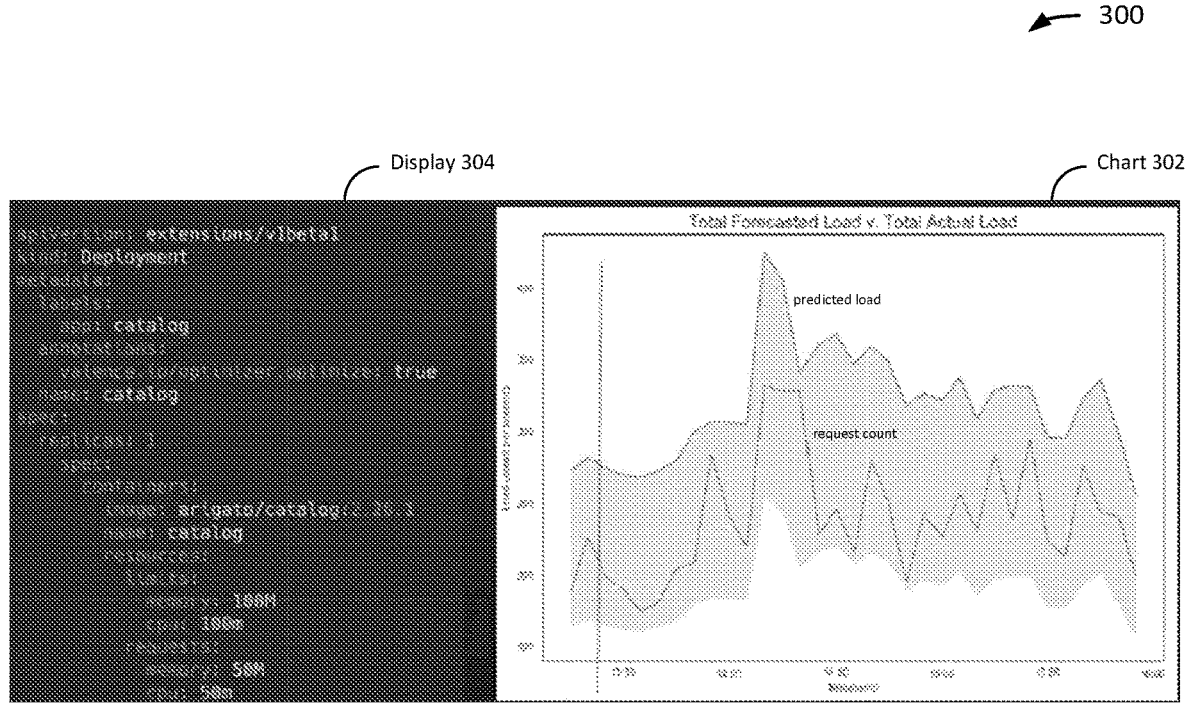
FIG. 3 is a diagram of a total forecasted load versus total actual load chart and associated code display.

FIG. 3 is a diagram 300 of a total forecasted load versus total actual load chart 302 and associated code display 304. The total forecasted load versus total actual load chart 302 has an x axis of seconds of a timestamp and a y axis of count per second of load. As can be seen, the predicted load curve always exceeds the request count curve by a relatively small margin (the provisioning insurance margin). The associated code display 304 indicates the resources include limits and requests, which were described in the preceding paragraph.

Figure 4:
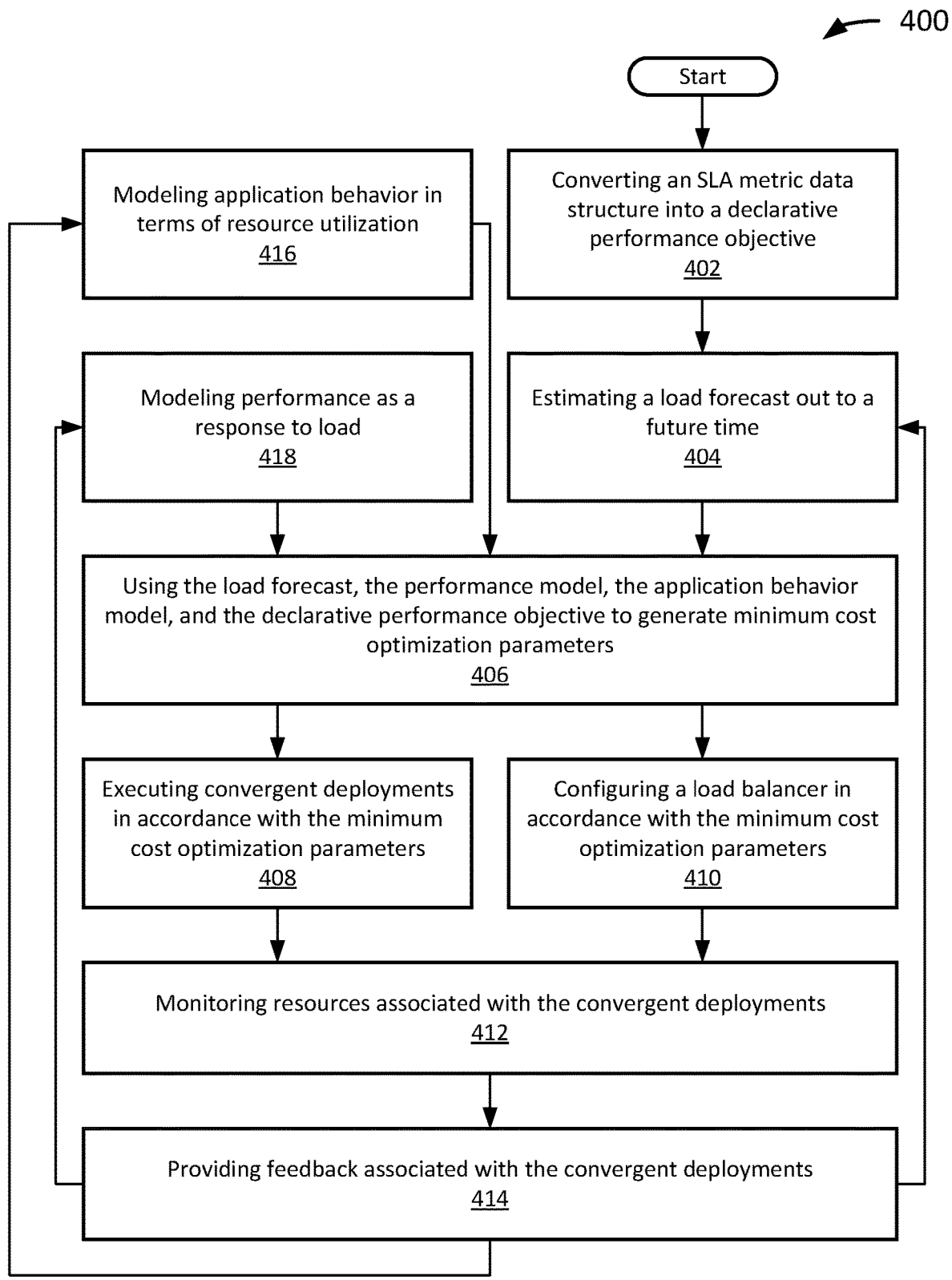
FIG. 4 depicts a flowchart of an example of a method of predictive autoscaling and resource optimization.

FIG. 4 depicts a flowchart 400 of an example of a method of predictive autoscaling and resource optimization. The flowchart 400 starts at module 402 with converting an SLA metric data structure into a declarative performance objective. The SLA metric data structure can be stored in an SLA metric datastore, such as the SLA metric datastore 104 described in association with FIG. 1. A declarative performance interface engine, such as the declarative performance interface engine 108 described in association with FIG. 1, can convert the SLA metric data structure into a declarative performance object.

The flowchart 400 continues to module 404 with estimating a load forecast out to a future time. For a new deployment, it should be noted the load forecast may be of limited use because it amounts to little more than a guess based upon known data regarding the deployment, without the benefit of feedback related to resource utilization and performance post-deployment. It typically takes a few minutes to receive and process such feedback, at which point the load forecast can become a much more predictive estimate. Accordingly, the module 404 could be skipped as unnecessary until such time as data becomes useful for making accurate predictions. An application load forecasting engine, such as the application load forecasting engine 114 described in association with FIG. 1, can estimate a load forecast out to a future time.

The flowchart 400 continues to module 406 with using the load forecast and the declarative performance objective to generate minimum cost optimization parameters. As was noted in the preceding paragraph, the forecast may be of limited use for accurately generating minimum cost optimization parameters. Moreover, although a model estimate could be provided in lieu of a performance model and an application behavior model generated in response to feedback associated with a deployment, such models are of limited value. After receiving feedback, the module 406 can also use the performance model and the application behavior model to generate minimum cost optimization parameters. (See the description associated with the modules 416 and 418 below.) A minimum cost optimization engine, such as the minimum cost optimization engine 116 described in association with FIG. 1, can use the load forecast, the performance model (if applicable), the application behavior model (if applicable), and the declarative performance objective to generate minimum cost optimization parameters.

The flowchart 400 continues to module 408 with executing convergent deployments in accordance with the minimum cost optimization parameters. An optimal configuration for scale resources actuator engine, such as the optimal configuration for scale resources actuator engine 118 described in association with FIG. 1, can execute convergent deployments in accordance with the minimum cost optimization parameters.

The flowchart 400 continues in parallel to module 410 with configuring a load distribution and metrics engine in accordance with the minimum cost optimization parameters. Although any applicable module can be configured for parallel execution with another, the modules 408 and 410 are relatively likely to be carried out in parallel, so the illustration is made rather explicit. Of course, the modules could be rearranged for serial processing. An optimal configuration for scale resources actuator engine, such as the optimal configuration for scale resources actuator engine 118 described in association with FIG. 1, can configure a load distribution and metrics engine in accordance with the minimum cost optimization parameters.

Following modules 408 and 410, the flowchart 400 continues to module 412 with monitoring resources associated with the convergent deployments. A convergent deployment and resource metrics collection engine, such as the convergent deployment, resource, and application level metrics collection engine 120 described in association with FIG. 1, can monitor resources (including channels) associated with the convergent deployments.

The flowchart 400 continues to module 414 with providing feedback associated with the convergent deployments. A convergent deployment and resource metrics collection engine, such as the convergent deployment, resource, and application level metrics collection engine 120 described in association with FIG. 1, can provide feedback associated with the convergent deployments.

The flowchart 400 returns to module 404 and continues as described previously and also (in parallel) continues to module 416 with modeling application behavior in terms of resource utilization. In a specific implementation, the modeling of application behavior requires a combined total of up to approximately 5 minutes to receive, process, and perform machine learning on feedback from module 414. Accordingly, in this description of the example of FIG. 4, the module 416 does is not introduced as quickly as module 404, though a model "stand-in" could be used. Moreover, the flowchart 400 could loop multiple times through other modules before module 416 completes. A dynamics estimation engine, such as the dynamics estimation engine 112 described in association with FIG. 1, can model application behavior in terms of resource utilization. From module 416, the flowchart 400 returns to module 406 and continues as described previously.

The flowchart 400 also continues to module 418 from module 414 with modeling performance as a response to load. In a specific implementation, the modeling of application behavior requires a combined total of up to approximately 5 minutes to receive, process, and perform machine learning on feedback from module 414. Accordingly, in this description of the example of FIG. 4, the module 418 does is not introduced as quickly as module 404, though a model "stand-in" could be used. Moreover, the flowchart 400 could loop multiple times through other modules before module 418 completes. A dynamics estimation engine, such as the dynamics estimation engine 112 described in association with FIG. 1, can model performance as a response to load. From module 418, the flowchart 400 returns to module 406 and continues as described previously.

It may be noted that the modules 404, 416, and 418 can be processed in parallel, though one or more of the modules can, for practical purposes, be skipped in a second loop from module 414 to module 404, 416, and module 418 if no updates to a model or forecast are made relative to the model or forecast from a first loop. Of course, the modules 404, 416, and 418 could also be rearranged for serial processing. It may also be noted the modules 404, 416, and 418 could conceivably come before the module 402 if a deployment is made without SLA metric data, which is provided later in the process. Finally, it may be noted that the module 402 could be repeated if declarative performance objectives change (not shown).

Figure 5:
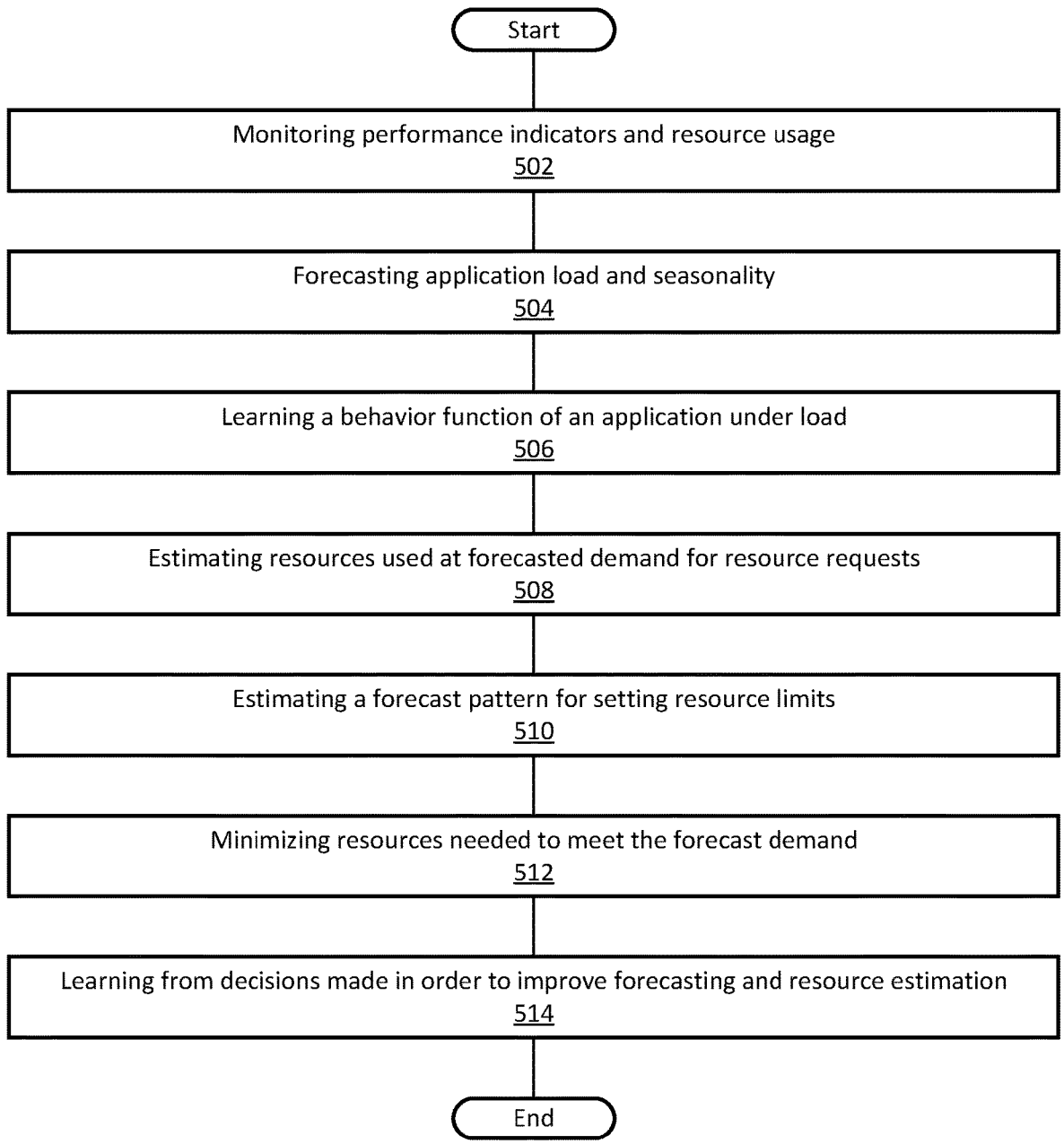
FIG. 5 depicts a flowchart of an example of generating predictive autoscaling and resource optimization results in association with a machine learning process.

FIG. 5 depicts a flowchart 500 of an example of generating predictive autoscaling and resource optimization results in association with a machine learning process. The flowchart 500 starts at module 502 with monitoring performance indicators and resource usage. A human or artificial agent of a service provider (or service consumer) can provide new performance indicators following, for example, a review of convergent deployment performance. A declarative performance interface engine, such as the declarative performance interface engine 108 described in association with FIG. 1, can monitor performance indicators. A convergent deployment and resource metrics collection engine, such as the convergent deployment, resource, and application level metrics collection engine 120 described in association with FIG. 1, can monitor resource usage.

The flowchart 500 continues to module 504 with forecasting application load and seasonality. Seasonality can be illustrated in association with a use case, which is, in this example, a shoe company e-commerce deployment. Successful shoe company e-commerce deployments typically have stable traffic with some seasonality at Black Friday and during the holidays, plus some seemingly random spikes (e.g., when new shoes are released). Because of the importance of performance on revenue during these events, reactive autoscaling is suboptimal at these times. Systems engineers will manually over-provision so SLOs are met. A predictive autoscaling and resource optimization system, as described in this paper, is able to learn these seasonalities and provision a correct amount of resources (with provisioning insurance) for these events without manual intervention. Moreover, during the year, new shoes are released and system engineers are often unprepared for the massive load during the release. By the time they scale up reactively to meet demand, the shoe is selling on eBay for 10× the price. A predictive autoscaling and resource optimization system, as described in this paper, is able to predict these seemingly random spikes in traffic and scale accordingly so SLOs are met, and maximum revenue and customer satisfaction are achieved. Advantageously, money is not wasted on over-provisioning just to be prepared for these events. An application load forecasting engine, such as the application load forecasting engine 114 described in association with FIG. 1, can forecast application load and seasonality.

The flowchart 500 continues to module 506 with learning a behavior function of an application under load. A dynamics estimation engine, such as the dynamics estimation engine 112 described in association with FIG. 1, can learn a behavior function of an application under load.

The flowchart 500 continues to module 508 with estimating resources used at forecasted demand for resource requests. An application load forecasting engine, such as the application load forecasting engine 114 described in association with FIG. 1, can estimate resources used at forecasted demand for resource requests.

The flowchart 500 continues to module 510 with estimating a forecast pattern for setting resource limits. An application load forecasting engine, such as the application load forecasting engine 114 described in association with FIG. 1, can estimate a forecast pattern for setting resource limits.

The flowchart 500 continues to module 512 with minimizing resources needed to meet the forecasted demand. A minimum cost optimization engine, such as the minimum cost optimization engine 116 described in association with FIG. 1, can minimize resources needed to meet the forecasted demand.

The flowchart 500 ends at module 514 with learning from decisions made in order to improve forecasting and resource estimation. An optimal configuration for scale resources actuator engine, such as the optimal configuration for scale resources actuator engine 118 described in association with FIG. 1, can benefit in convergent deployment from learning from decisions made in order to improve forecasting and resource estimation.

Figure 6:
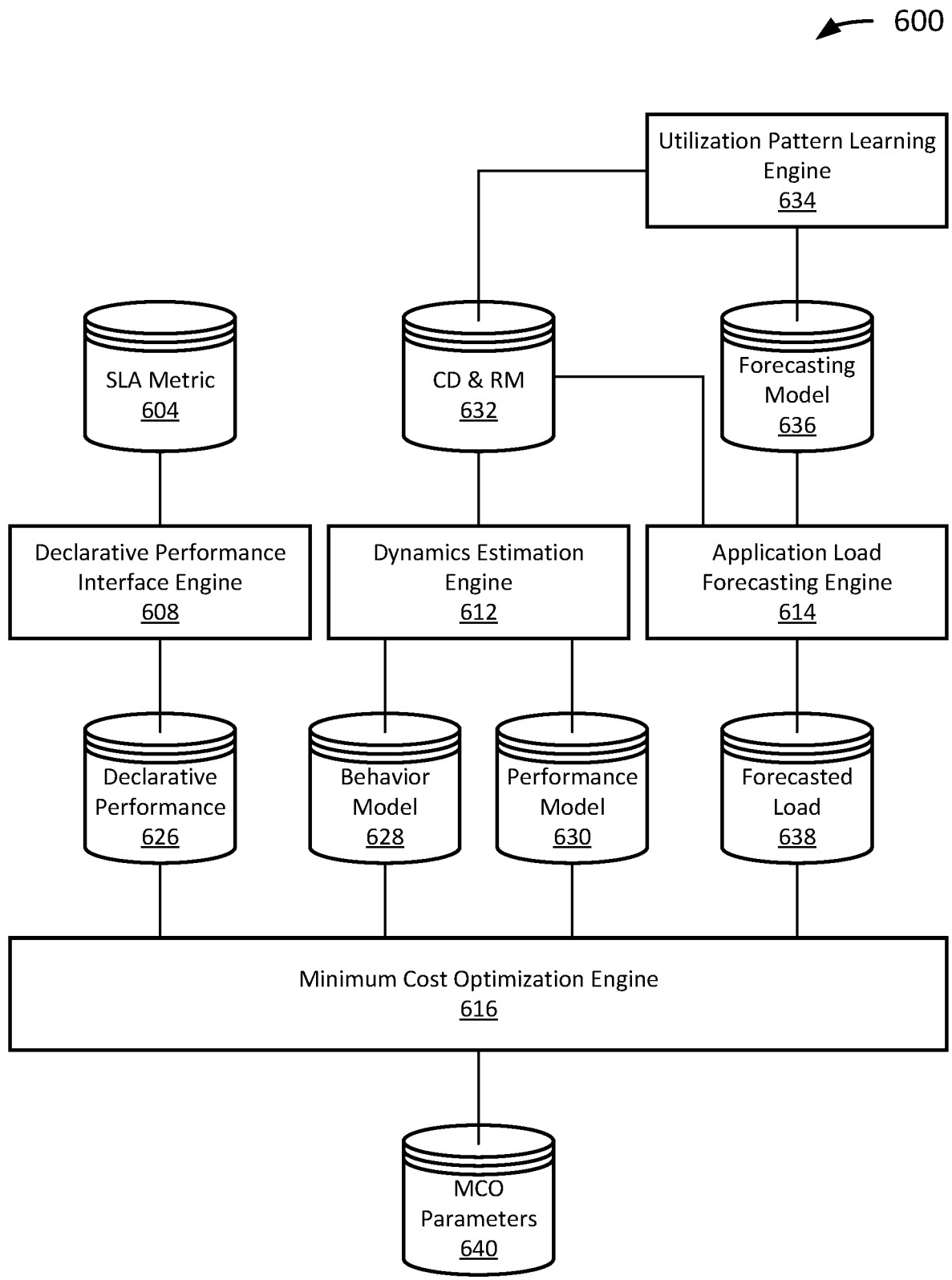
FIG. 6 depicts a diagram of an example of a system for generating minimum cost optimization parameters.

FIG. 6 depicts a diagram 600 of an example of a system for generating minimum cost optimization parameters. The diagram 600 includes an SLA metrics datastore 604, which may be implemented as the SLA metrics datastore 104 described in association with FIG. 1; a declarative performance interface engine 608 coupled to the SLA metric datastore 604 and which may be implemented as the declarative performance interface engine 108 described in association with FIG. 1; a dynamics estimation engine 612, which may be implemented as the dynamics estimation engine 112 described in association with FIG. 1; an application load forecasting engine 614, which may be implemented as the application load forecasting engine 114 described in association with FIG. 1; a minimum cost optimization engine 616, which may be implemented as the minimum cost optimization engine 116 described in association with FIG. 1; a declarative performance datastore 626 coupled to the declarative performance interface engine 608 and the minimum cost optimization engine 616; a behavior model datastore 628 coupled to the dynamics estimation engine 612 and the minimum cost optimization engine 616; a performance model datastore 630 coupled to the dynamics estimation engine 612 and the minimum cost optimization engine 616; a convergent deployment and resource metrics datastore 632 coupled to the dynamics estimation engine 612 and the application load forecasting engine 614; a utilization pattern learning engine 634 coupled to the convergent deployment and resource metric datastore 632; a forecasting model datastore 636 coupled to the application load forecasting engine 614 and the utilization pattern learning engine 634; a forecasted load datastore 638 coupled to the application load forecasting engine 614 and the minimum cost optimization engine 616; and a minimum cost optimization parameters datastore 640 coupled to the minimum cost optimization engine 616.

The declarative performance interface engine 608 converts SLA metrics from the SLA metric datastore 604 to declarative performance data structures represented by the declarative performance datastore 626. The declarative performance interface engine 608 may or may not receive instructions from a human or artificial agent of a service provider (or service consumer) to populate the SLA metric datastore 604. If the SLA metric datastore 604 is modified, the declarative performance engine 608 converts the modification so as to match an intended SLO represented in the SLA metric datastore 604 with a declarative performance data structure in the declarative performance datastore 626.

The dynamics estimation engine 608 uses machine learning techniques, such as deep learning, to generate a behavior model, which is represented by the behavior model datastore 628 and to generate a performance model, which is represented by the performance model datastore 630. The models can be improved with feedback associated with applicable convergent deployments. Such feedback is represented by the convergent deployment and resource metrics datastore 632. The convergent deployment and resource metric datastore 632 can be populated by a convergent deployment and resource metrics collection engine (not shown), which may be implemented as the convergent deployment, resource, and application level metrics collection engine 120 described in association with FIG. 1.

The utilization pattern learning engine 634 uses deep learning to understand workload to generate models for seasonal load, trendy load, bursty load, and random load. Based on a request and an understanding of workload, signature limits can be set on a deployment according to a utilization pattern (e.g., bursty resulting in a higher limit vs. stable resulting in a lower limit). The result of the deep learning is a forecasting model represented by the forecasting model datastore 636. The forecasting model datastore 636 can be improved with feedback associated with applicable convergent deployments. Such feedback is represented by the convergent deployment and resource metrics datastore 632.

The application load forecasting engine 614 uses one or more forecasting models from the forecasting model datastore 636 and feedback from the convergent deployment and resource metrics datastore 632 to estimate resource usage at a future time; this forecasted load is represented by the forecasted load datastore 638.

The minimum cost optimization engine 616 uses the declarative performance datastore 626, the behavior model datastore 628, the performance model datastore 630, and the forecasted load datastore 638 to generate minimum cost optimization parameters, which are represented by the minimum cost optimization parameters datastore 640. The minimum cost optimization parameters can be used by a software deployment platform that can include, for example, an optimal configuration for scale resources actuator engine (not shown), which may be implemented as the optimal configuration for scale resources actuator engine 118 described in association with FIG. 1.

The invention claimed is:

1. A system, comprising:
one or more processors; and
a memory coupled to the one or more processors, wherein the memory is configured to store instructions that, when executed by the one or more processors, cause the system to be configured to:
receive service level agreement (SLA) metrics;
convert the SLA metrics to declarative performance data structures, that represent declared performance objectives for software deployment;
monitor performance indicators and resource usage of deployed software;
generate an application behavior model, based on the performance indicators and the resource usage as a function of a load of the deployed software;
forecast the load of the deployed software at a future time;
generate minimum cost optimization parameters based on the declarative performance data structures, the application behavior model, and the forecasted load of the deployed software;
execute convergent deployments of the deployed software;
perform load balancing on one or more of traffic to the convergent deployments and traffic from the convergent deployments in accordance with the minimum cost optimization parameters;
monitor resources associated with the convergent deployments; and
generate an updated application behavior model based on feedback associated with the convergent deployments.

2. The system of claim 1, wherein the SLA metrics comprise one or more of service level indicator (SLI) metrics and service level objective (SLO) metrics.

3. The system of claim 1, wherein the SLA metrics are defined by a human agent.

4. The system of claim 1, wherein the SLA metrics are defined by an artificial agent.

5. The system of claim 1, wherein the performance indicators comprise request count, a request duration, or a combination thereof.

6. The system of claim 1, wherein the resource usage comprises a memory usage, a central processing unit (CPU) power consumption, a disk input/output (I/O) usage, a network I/O usage, or a combination thereof.

7. The system of claim 1, wherein the forecasted load comprises a seasonal load, a trendy load, a bursty load, a random load, or a combination thereof.

8. The system of claim 1, wherein the instructions, when executed by, the one or more processors, further cause the system to be configured to estimate a forecast pattern for use in setting resource limits.

9. The system of claim 1, wherein the application behavior model is generated using deep learning.

10. The system of claim 1, wherein the instructions, when executed by the one or more processors, further cause the system to be configured to determine a measured error based on the declared performance objectives.

11. A method comprising:
receiving service level agreement (SLA) metrics;
converting the SLA metrics to declarative performance data structures, that represent declared performance objectives for software deployment;

monitoring performance indicators and resource usage of deployed software;
generating an application behavior model based on the performance indicators and the resource usage as a function of a load of the deployed software;
forecasting the load of the deployed software at a future time;
generating minimum cost optimization parameters based on the declarative performance data structures, the application behavior model, and the forecasted load of the deployed software;
executing convergent deployments of the deployed software;
performing load balancing on one or more of traffic to the convergent deployments and traffic from the convergent deployments in accordance with the minimum cost optimization parameters;
monitoring resources associated with the convergent deployments;
providing feedback associated with the convergent deployments; and generating an updated application behavior model based on the feedback.

12. The method of claim 11, wherein the SLA metrics comprise one or more of service level indicator (SLI) metrics and service level objective (SLO) metrics.

13. The method of claim 11, wherein the SLA metrics are defined by an artificial agent.

14. The method of claim 11, wherein the performance indicators comprise a request count, a request duration, or a combination thereof.

15. The method of claim 11, wherein the resource usage comprises a memory usage, a central processing unit (CPU) power consumption, a disk input/output (I/O) usage, a network I/O usage, or a combination thereof.

16. The method of claim 11, wherein the forecasted load comprises a seasonal load, a trendy load, a bursty load, a random load, or a combination thereof.

17. The method of claim 11, further comprising estimating a forecast pattern for use in setting resource limits.

18. The method of claim 11, wherein the application behavior model is generated using deep learning.

19. The method of claim 11, further comprising determining a measured error based on the declared performance objectives.

20. A system, comprising:
means for receiving service level agreement (SLA) metrics;
means for converting the SLA metrics to declarative performance data structures, that represent declared performance objectives for software deployment;
means for monitoring performance indicators and resource usage of deployed software;
means for generating an application behavior model based on the performance indicators and the resource usage as a function of a load of the deployed software;
means for forecasting the load of the deployed software at a future time;
means for generating minimum cost optimization parameters based on the declarative performance data structures, the application behavior model, and the forecasted load of the deployed software;
means for executing convergent deployments of the deployed software;
means for performing load balancing on one or more of traffic to the convergent deployments and traffic from the convergent deployments in accordance with the minimum cost optimization parameters;
means for monitoring resources associated with the convergent deployments;
means for providing feedback associated with the convergent deployments; and
means for generating an updated application behavior model based on the feedback.

* * * * *